United States Patent

Berger

[15] 3,700,715
[45] Oct. 24, 1972

[54] POLYAMINOALKYLTHIOALKYL SILANES

[72] Inventor: Abe Berger, Schenectady, N.Y.

[73] Assignee: General Electric Company

[22] Filed: Aug. 23, 1971

[21] Appl. No.: 174,164

[52] U.S. Cl..............260/448.8 R, 210/54, 252/357, 260/239 E, 260/448.2 E, 260/448.2 N
[51] Int. Cl...............................C07f 7/10, C07f 7/18
[58] Field of Search...260/448.2 N, 448.8 R, 448.2 E

[56] References Cited

UNITED STATES PATENTS

| | | | |
|---|---|---|---|
| 2,938,046 | 5/1960 | Morehouse | 260/448.2 N |
| 3,278,484 | 10/1966 | Tesoro | 260/448.8 R X |
| 3,488,373 | 10/1970 | Berger | 260/448.8 R X |

*Primary Examiner*—Tobias E. Levow
*Assistant Examiner*—P. F. Shaver
*Attorney*—Donald J. Boss et al.

[57] ABSTRACT

A novel class of silicone compounds of the formula,

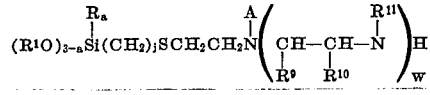

where R and $R^1$ are independently selected from monovalent hydrocarbon radicals, $R^9$, $R^{10}$ and $R^{11}$ are selected from the class consisting of hydrogen, alkyl radicals and aryl radicals, A is selected from hydrogen, alkyl radicals, aryl radicals and amino alkyl radicals, $j$ varies from 2 to 20, $w$ varies from 1 to 500 and varies from 0 to 2. The novel compounds are useful as flocculants for colloidal organic matter.

8 Claims, No Drawings

POLYAMINOALKYLTHIOALKYL SILANES

BACKGROUND OF THE INVENTION

The present invention relates to silicone compounds and in particular the present invention relates to polyaminoalkylthioalkylsilanes useful as flocculants for colloidal organic matter.

Flocculants for the purpose of precipitating colloidal matter are widely used in many industries. At the present time, in particular, there has developed wide spread use of processes for the purification of sewage water and waste water of various types. In such purification systems there develops that there is suspended in the waste water organic colloidal matter. Such material is flocculated and precipitated by various flocculating agents depending on the composition of the suspended matter.

Flocculating agents are grouped into four different classes comprising the colloidal hydroxides of polyvalent metals, non-anionic, anionic and cationic polyelectrolites. In the flocculating and the purification of sewage systems, the matter to be flocculated comprises colloidal organic matter. It has been found that of the four classes of flocculants given above, that the cationic polyelectrolites are most efficient in flocculating colloidal organic matter. At the present time there are various cationic polyelectrolites used to flocculate colloidal organic matter. However, there is constant research and development to find ever more efficient flocculating agents for organic waste matter.

In addition, the inorganic compound known as silica sol or silicic acid has been found to flocculate organic waste matter. However, this compound is not very efficient in such flocculating capacity at the present time. It is, thus, desired to develop compounds which in conjunction with the silica sol will result in a flocculating composition that is very efficient in precipitating organic waste matter.

In addition, as is known, there are many articles manufactured in which various types of resins, rubber, both natural and synthetic are bonded to glass and glass types of products. In particular, there is to be noted the use of glass fibers in the reinforcement of rubber tires. In such application of glass product compounds such as glass fibers, it is necessary to size the glass or glass fibers with a bonding agent so that the rubber or other material will closely adhere and bond to the glass fibers and glass material. Although there are presently some agents used for this purpose, manufacturers desire additional bonding agents which will produce superior and high strength bonds between glass materials such as glass fibers and rubber compositions of both natural and synthetic rubber, as well as various types of plastics. In particular, it is desired to develop a very superior bonding agent for treating glass fibers so that they will strongly adhere to synthetic rubber in the production of glass reinforced tires.

It is one object of the present invention to provide a novel class of silicone compounds.

It is another object of the present invention to provide a process for producing a novel class of silicone compounds.

It is yet another object of the present invention to provide a novel class of silicone compounds useful as flocculants for colloidal organic matter.

It is still another object of the present invention to provide a novel class of silicone compounds useful as bonding agents for bonding a glass type of materials such as glass fibers to rubber as well as plastic resins.

These and other objects of the present invention are accomplished by means of the invention defined below.

SUMMARY OF THE INVENTION

In accordance with the present invention, there is provided a novel class of silicone compounds of the formula, (1) 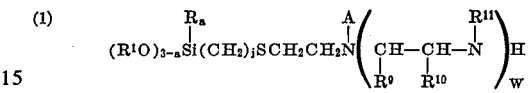

where R and $R^1$ are independently selected from monovalent hydrocarbon radicals, $R^9$, $R^{10}$ and $R^{11}$ are selected from the class consisting of hydrogen, alkyl radicals and aryl radicals of up to 10 carbon atoms, A is selected from the group consisting of hydrogen, alkyl radicals, aryl radicals and the radical,

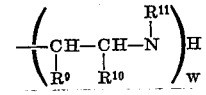

where $j$ is a whole number that varies from 1 to 20, $w$ is a whole number varying from 1 to 500 and $a$ is a whole number that varies from 0 to 2. In formula (1) above, it is preferred that R and $R^1$ are methyl and $R^9$, $R^{10}$ and $R^{11}$ are hydrogen.

The compound of formula (1) is obtained by reacting aminoalkylthioalkylsilane with an alkylene imine in the presence of a Lewis acid.

DETAILED DESCRIPTION OF THE PREFERRED EMBODIMENT

The radicals R and $R^1$ are independently selected from monovalent hydrocarbon radicals and preferably monovalent hydrocarbon radicals of less than 10 carbon atoms. The radicals R and $R^1$ may be, for instance, alkyl radicals, e.g., methyl, ethyl, propyl, butyl, octyl, etc. radicals; aryl radicals, e.g., phenyl, naphthyl, tolyl, xylyl, etc. radicals; aralkyl radicals, e.g., benzyl, phenylethyl, etc. radicals; alkenyl radicals, e.g., vinyl, allyl, cyclohexyl, etc. radicals; cycloalkyl radicals, e.g., cyclohexyl, cycloheptyl, etc. radicals and other similar types of hydrocarbon radicals. Preferably, the radicals R and $R^1$ have less than 10 carbon atoms and more preferably R and $R^1$ are the lower alkyl radicals such as methyl, ethyl, propyl, etc.

The radicals $R^9$, $R^{10}$ and $R^{11}$ are preferably selected from hydrogen, alkyl and aryl radicals of up to 10 carbon atoms. These radicals may be all the same or different. Preferably, the radicals $R^9$, $R^{10}$ and $R^{11}$ are all hydrogen or at least one of these radicals is hydrogen. However, it is within the scope of the present invention that in the same molecule coming within the scope of formula (1), that radicals $R^9$, $R^{10}$ and $R^{11}$ are all alkyl radicals or aryl radicals or some of the radicals are alkyl and others are aryl.

The symbol A in the case of linear molecules coming within the scope of formula (1) is preferably hydrogen or alkyl and aryl radicals such as methyl, ethyl, or phenyl of less than 10 carbon atoms. For polymeric materials coming within the scope of formula (1), and particularly branched polymeric materials, symbol A may be represented by the amino alkylene radical disclosed above. The symbol $j$ is a whole number that varies from 1 to 20 and is preferably less than 10, $w$ is a whole number that varies from 1 to 500. For linear types of molecules within the scope of formula (1), $w$ is preferably less than 10. However, in the case where compounds coming within the scope of formula (1) are polymers and particularly branched chain polymers, $w$ may vary from 5 to 500 and the value that $w$ has within the scope of formula (1), depends on the amount of reactants in the synthesis as will be explained below.

One of the more preferred compounds coming within the scope of formula (1) has the formula, $(CH_3O)_3SiCH_2CH_2CH_2SCH_2CH_2NHCH_2CH_2NH_2$ (2).

Other more preferred compounds coming within the scope of generic formula (1) above, are:

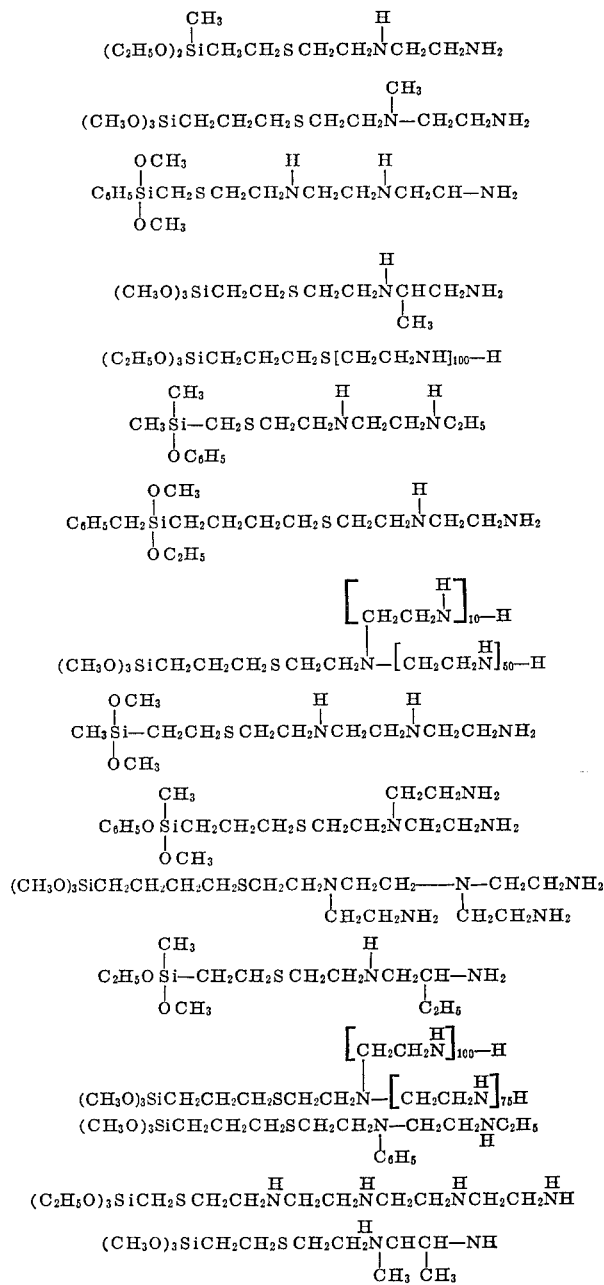

The compound of formula (1) is produced by reacting a compound of the formula, (3) $(R^1O)_{3-a}\underset{R_a}{Si}\left((CH_2)_jSCH_2CH_2\underset{R^{30}}{N}\right)H$ with a compound of the formula, (4) 
$$\underset{R^9\ \ \ R^{10}}{\overset{R^{11}}{\underset{|}{N}}\atop CH\text{---}CH}$$

which compounds are reacted in the presence of a Lewis acid catalyst or a protonic catalyst. In the above formulas, i.e., formulas (3) and (4), the symbols $R^1$, $a$, $j$, $R^{11}$, $R^9$ and $R^{10}$ are as defined previously. The radical $R^{30}$ is selected from hydrogen, alkyl and aryl radicals of up to 10 carbon atoms. The reaction of the compounds of formulas (3) and (4) is carried out in the presence of a Lewis acid catalyst such as aluminum chloride, zinc chloride, mercurous chloride, stannic chloride and other such types of Lewis acid catalysts. In place of the Lewis acid catalyst, there may be present any protonic acid catalyst such as hydrogen chloride, ammonium chloride, nitric acid, toluene sulfonic acid, etc. This catalyst is necessary for the reaction to proceed. In addition, the catalyst must be present in a concentration of 0.1 to 5 percent by weight of the reactants and preferably 0.5 to 3 percent by weight of the reactants.

The compounds of formula (3) and (4) are reacted stoichiometrically, i.e., in a 1:1 mole ratio if it is desired to only add on one molecule of the compound of formula (4) to the amine group of the compound of formula (3). If it is desired to add two or more molecules but to maintain the resulting compound of formula (1) in linear form, then the compound of formula (4) is added in an excess molar amount over the molar amount of the compound of formula (3). If the amount of molar excess of the compound of formula (4) is up to 50 to 75 percent, in terms of the molar amount of the compound of formula (3) present, then a linear compound within the scope of formula (1) will be formed, where $w$ varies from 1 to 5 and the symbol A is hydrogen.

It should be noted that if the symbol $R^{30}$ for formula (3) is an alkyl or aryl radical then even if more than 50 to 75 excess molar amount of the compound of formula (4) is added to the compound of formula (3), then branching could occur further out in the molecule. However, in the case where $R^{30}$ is hydrogen and if the amount of the compound of formula (4) is in excess by only 50 to 75 molar percent, then the reactant of formula (4) could attack the nitrogen at the $R^{30}$ position so as to form a branched chain molecule.

It should be noted when it is desired to form a linear molecule and $R^{30}$ is hydrogen then as stated previously no more than 50 to 75 molar excess of the compound of formula (4) with respect to the compound of formula (3) should be used. In addition, the compound of formula (4) should be slowly added to the compound of formula (3) so that the reaction mixture and particularly in the initial part of the reaction period there is always an excess of the compound of formula (3).

In the case where it is desired to form either a linear or branched chain polymer, i.e., in the case where A within the scope of formula (1) is equal to hydrogen or in the case where A is equal to an alkyl or aryl radical and $w$ is in excess of 5 and may be up as high as 100, then such compounds are obtained by reacting the compounds of formula (3) with a compound of formula (4) wherein there is present 100 to 200 or more moles of the compound of formula (4) per mole of the compound of formula (3). Thus, by reacting large molar excesses of the compound of formula (4), per mole of the compound of formula (3), it is possible to obtain polymers within the scope of formula (1) whether they be linear or branched chain where $w$ varies anywhere from 1 to 100. To obtain these polymers rather than the monomers, it is only necessary to use the molar excesses stated above and the molar excesses that are needed to obtain the desired value of $w$. The only other necessary constituent of the reaction is the catalyst. When $R^{30}$ is equal to an alkyl or aryl radical then the value of $w$ is strictly determined by the molar amounts of the compound of formula (4).

The above reactions of compounds of formulas (3) and (4) is preferably carried out in the temperature range of 50° to 150° C and preferably 80° to 120° C. The reaction takes place in the time of 2 to 8 hours and preferably 5 to 6 hours with the above-defined catalyst system. It is preferable that this reaction be carried out in the presence of a solvent since it allows more intimate contact between the reactants. The preferable solvents are the usual alkanol solvents as well as the inert ether solvents known in the art. Such solvents, for example, are methanol, ethanol, isopropanol, tetrahydrofuran, dioxane, ethylene-glycol, dimethylether etc. Using the above procedure, it is possible to get a yield of as high as 95 to 100 percent. As pointed out, the Lewis acid catalyst or the protonic catalyst are a necessary part of the above reaction. Other examples of protonic catalysts are phosphoric acid, hydrobromic acid and hydrofluoric acid, as well as other types of acids.

The compounds within the scope of formula (4) above are compounds well known in the art and such compounds are sold by Dow Chemical Co., Midland, Michigan and Arsynco Chemical, Carlstadt, New Jersey. The compounds of formula (3) above are easily synthesized in a manner well known in the art. In the case where $j$ in formula (3) above is equal to 3 or more, the compound is synthesized by reacting a compound of the formula, $$CH_2=CH(CH_2)_d Cl \qquad (5).$$

wherein in formula (5) above, $d$ varies from 1 to 18 with a silane of the formula,

in the presence of a platinum catalyst. In formula (6) above, Z is halogen and the radical R is as previously defined. Both of the compounds of formulas (5) and (6) are well known compounds in the art and in this reaction it is preferable to use an equivalent molar amount of the compound of formula (6) and formula (5) to obtain a high yield. The platinum compound catalyst can be selected from the group of platinum compound catalysts which are operative to catalyze the addition of silicon hydrogen bonds across olefinic bonds.

Among the many useful catalysts for this addition reaction are chloroplatinic acid as described in U.S. Pat. No. 2,823,218 — Speier et al; the reaction product of chloroplatinic acid with either an alcohol ether or an aldehyde as described in U.S. Pat. No. 3,220,972 — Lamoreaux; trimethyl platinum hydride and hexamethyldiplatinum as described in U.S. Pat. No. 3,313,773 — Lamoreaux; the platinum olefin complex catalyst as described in U.S. Pat. No. 3,159,601 — Ashby and the platinum cyclopropane complex catalyst described in U.S. Pat. No. 3,159,662 — Ashby.

The SiH—olefin addition reaction may be run at room temperature or at temperatures up to 200° C depending upon the catalyst concentration. A reaction temperature of 50° to 100° C is preferred. The catalyst concentration can vary from $10^{-7}$ to $10^{-3}$, and preferably $10^{-5}$ to $10^{-4}$ mole of platinum as metal per mole of the olefinic containing molecules present. Any of the known hydrocarbon solvents such as alkanols and the ketones and other types of solvents may be used as solvents to this reaction. The reaction takes place in the time of 2 to 6 hours and with the above reaction conditions.

The reaction product of the above reaction between the compounds of formula (5) and (6) may then be alkoxylated or involved in an alcoholysis reaction to substitute an alkoxy or aryloxy group for the Z halogen. Such a reaction which is known as an alcoholysis is carried out by mixing the reaction product between formulas (5) and (6) with an alcohol such as R'OH, where R' is as defined previously and then heating the resulting mixture to a temperature in the range of between 40° to 120° C, and preferably 50° to 100° C under vacuum. Preferably, the vacuum is about 20 inches of mercury or greater. The vacuum is used to remove the hydrogen chloride that is formed so that it will not interreact or cause secondary reaction products. In an alternative procedure instead of using vacuum to remove the hydrogen chloride, the reaction can take place in a solvent such as toluene, xylene, cyclohexane or mineral spirits in which hydrogen chloride is not soluble so that the hydrogen chloride will immediately be given off and not effect the molecule.

As an alternate method, the halogen compounds may be reacted with an orthoformate compound of the formula, $(R^1O)_3CH$, so as to substitute the Z radicals with an $R^1O$ group on the silane molecule. This reaction is well known and there is no need to disclose further details as to it. The resulting alkoxylated silylalkyl halide molecule may then be taken and reacted with thio urea to produce a compound of the formula,

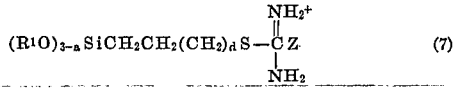

In the above formula, the radicals R, R¹, Z, $a$ and $d$ are as previously defined.

This reaction with thio urea takes place in stoichiomertic proportions and in an alcohol solvent, preferably, an alkanol such as methanol, ethanol, etc. The reaction is carried out by refluxing the reactants in the alcohol at a temperature within the range of 60° to 110° C for a period of 5 to 12 hours. No catalyst is necessary in this reaction and the yield that is obtained is about 90 percent. For more details as to this reaction, the reader is referred to German Pat. No. 1,163,818 and the disclosure of this patent is hereby incorporated into this specification by reference.

The product of the above reaction, i.e., the compound of formula (7) is then taken and refluxed again in an alcohol solvent while gaseous ammonia is bubbled through the solution. The alcohol may be the same alcohol that was used in the previous reaction to produce the compound of formula (7). The ammonia is bubbled through the solution for 1 to 6 hours so as to cleave the molecule and form an alkylene mercapto group connected to the silicon atom. This refluxing procedure with ammonia being bubbled through is carried out at a temperature range of 50° to 110° C and preferably 70° to 100° C. Of course, the heating temperature at which the reflux is carried out will depend on the boiling point of the alcohol used. This reaction proceeds in the period of time indicated above to produce a yield of about 75 percent of a compound of the formula,

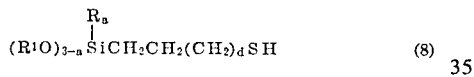  (8)

The compound of formula (8) above is then taken and reacted with ethylene imine or an ethylene imine derivative in stoichiometric proportions in the presence of basic catalyst system.

One catalyst system that can be used is benzyl trimethyl ammonium hydroxide at a concentration of 0.01 to 2 percent by weight of the reactants. Thus, by reacting the compound of formula (8) with ethylene amine or a derivative ethylene amine, the compound of formula (3) is obtained in good yield.

In the presence of the catalyst disclosed above, it is possible to get 75 to 85 percent yield of the compound of formula (3) in a reaction time varying from 5 to 24 hours, and preferably 10 to 20 hours.

In lieu of the above catalyst system, there may be used any other type of basic catalyst system such as sodium methoxide, other quarterium ammonium hydroxide, basic ionic exchange resins, such as Rexon 201, sodium hydroxide, etc. Preferably, the reaction is carried out in a solvent although such a solvent is not necessary. Examples of the solvents which may be used are the same ones as given above as the common types of ether solvents and other types of inert hydrocarbon solvents. The reaction is carried out at a temperature range of anywhere from 70° to 150° C, and preferably 90° to 140° C so as to increase the yield and decrease the reaction time. For further details as to the last discussed reaction, one is referred to the disclosure in U.S. Pat. No. 3,488,373. The disclosure of this patent is incorporated into this present application by reference.

In the case in formula (3), where $j$ is equal to 2 then a slightly different synthesis is used. The compound of formula (6) above is reacted with acetylene where acetylene is used with 3 or 4 moles excess of acetylene per mole of the silane of formula (6) in the presence of a platinum catalyst. This reaction is carried out preferably under pressure at a pressure ranging from 20 to 200 psig. and at a temperature range varying from 80° to 150° C. No solvent is used in this reaction since it serves no purpose. The reaction proceeds with a yield of 65 to 85 percent in a period of reaction time of 2 to 8 hours. As a result of this reaction, there is obtained a product of the formula,

  (9)

This compound may then be alkoxylated with an alcohol or with an orthoformate in the same manner as disclosed previously for the prior synthesis. After the compound of formula (9) has been alkoxylated, then it may be taken and reacted with thiolacetic acid at room temperature in the presence of ultra violet light which acts as a catalyst. The compound of formula (9) and thiolacetic acid are reacted in stoichiometric proportions without any solvent being present since the solvent does not serve any useful purpose in this case. The reaction time varies from 1 to 7 hours and preferably 1 to 4 hours. With this reaction there is obtained a yield anywhere from 60 to 90 percent of a compound of the formula,

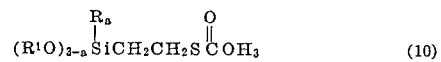  (10)

The resulting product of this reaction is then taken and dissolved in methanol or other usual type of alkanol solvent. The resulting solution is heated to a temperature in the range of 50° to 120° C and preferably at the reflux temperature of the alkanol solvent. At the same time, gaseous ammonia is bubbled through the solution for a period of time varying from 3 to 8 hours. Using this procedure, there is obtained a silane having an ethylene mercapto group connected to the silicon atom in 75 to 85 percent of yield under the conditions noted above. The dissolving of the reaction product of a compound formed with the thiolacetic acid and the bubbling of gaseous ammonia through the solution is the same procedure as discussed above in the previous synthesis and similar reaction conditions apply in both cases. The product of this ammonia treatment which is a silane having an ethylene mercapto group attached to it may then be reacted with ethylene imine or a derivative of ethylene imine to produce a compound within the scope of formula (3), wherein $j$ is equal to 2. This reaction as well as the reaction conditions are the same as that disclosed above in the prior synthesis for the compounds within the scope of formula (3), where $j$ is equal to 3 and greater values than 3. For further details as to this reaction with the ethylene imine, one is referred to the disclosure of U.S. Pat. No. 3,488,373, mentioned previously.

It should be mentioned that the compounds of formula (4) which are involved in the basic reaction first mentioned in the specification, are commercially sold by the Dow Chemical Co., Midland, Michigan and Arsynco Chemical Co., Carlstadt, New Jersey.

The following examples are given for the purpose of illustrating the invention and not intended to limit the invention in any way.

EXAMPLE 1

Into a reaction flask there is placed 85 g. aminoethylthiopropyltrimethoxysilane (0.35 mole), 15.3 g. ethylene imine (0.35 mole) and one-half gram ammonium chloride. The reaction is then brought to reflux and heated for a period of 5 – 6 hours taking care that the temperature does not exceed 120° C. Following this a gas chromatography showed that a higher boiling adduct is present upon fractionation, a pure cut is obtained at 148°–150°/0.2 mm. (>99 percent gas chromatography). An infrared scan is consistent with the proposed structure and further confirmation is obtained by nuclear magnetic resonance. The total product is obtained in 85 percent yield and has the structure, $$(CH_3O)_3Si(CH_2)_3S(CH_2)_2NH(CH_2)_2NH_2$$

EXAMPLE 2

A mixture of 170 g. aminoethylthiopropyltrimethoxysilane (0.7 mole), 266 ml. anhydrous isopropanol and 9.4 g. ammonium chloride are combined and heated to 85° C for 15 – 20 minutes. Ammonia gas evolves during this phase of the reaction. Following this, 240.8 g. ethylene imine (5.6 mole) is introduced at a rate of about 2–2.5 ml/min. maintaining the pot temperature within the range of 82°–88° C. By rate of addition and application of external heat, if necessary, the above temperature range is maintained. Upon complete addition of the amine, the reaction is kept at 85° for an additional hour which is followed by 2 hours at 90° – 95° C. The reaction mixture is then cooled and filtered. The composition thus obtained has the molecular formula,

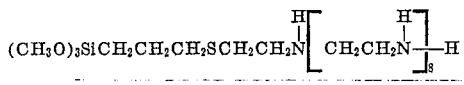

EXAMPLE 3

Using the procedure of Example 2, 10 moles of ethylene imine (430 g.) is reacted with a solution of aminoethylthiopropyltrimethoxysilane 23.9 g. (0.1 mole) in 227 ml isopropanol containing 1 gram ammonium chloride to produce a composition with the molecular formula,

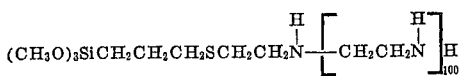

EXAMPLE 4

The reaction of equimolar amounts of mercaptoethyltriethoxysilane with N-ethylaziridine using 1 percent Triton B catalyst at reflux results in the formation of

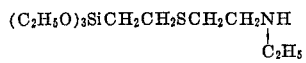

Then an equimolar amount of N-ethylaziridine is added slowly to the above composition containing one-half percent aluminum chloride catalyst, at about 90° C. A reaction occurs from which the following product is isolated upon fractionation,

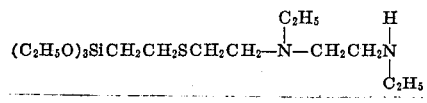

I claim:

1. A silicone compound of the formula,

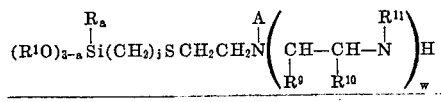

where R and $R^1$ are independently selected from monovalent hydrocarbon radicals, $R^9$, $R^{10}$, and $R_{11}$ are selected from the class consisting of hydrogen, alkyl radicals and aryl radicals of up to 10 carbon atoms, $j$ is a whole number that varies from 2 to 20, A is selected from the group consisting of hydrogen, alkyl radicals, aryl radicals and

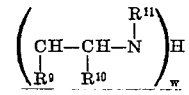

$w$ is a whole number varying from 1 to 500 and $a$ is a whole number that varies from 0 to 2.

2. The silicone compound of claim 1 wherein R and $R^1$ are methyl and $R^9$, $R^{10}$ and $R^{11}$ are hydrogen.

3. The silicone compound of claim 1 wherein the compound has the formula, $$(CH_3O)_3Si\ CH_2CH_2CH_2SCH_2CH_2NHCH_2CH_2NH_2.$$

4. A method for producing a silicone compound of the formula,

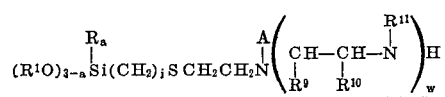

comprising reacting a compound of the formula,

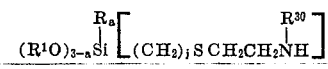

with a compound of the formula,

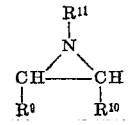

where R and $R^1$ are selected from the class consisting of monovalent hydrocarbon radicals and monovalent halogenated hydrocarbon radicals, $R^9$, $R^{10}$ and $R^{11}$ are selected from the class consisting of hydrogen, alkyl radicals and aryl radicals of up to 10 carbon atoms, A is selected from the class consisting of hydrogen, alkyl radicals, aryl radicals and

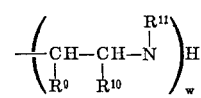

$R^{30}$ is selected from the class consisting of alkyl radicals and aryl radicals of up to 10 carbon atoms, $j$ is a whole number that varies from 2 to 20, $w$ is a whole number varying from 1 to 100, and $a$ is a whole number that varies from 0 to 2.

5. The method of claim 4 wherein the two reactants are reacted with each other in a 1:1 ratio.

6. The method of claim 4 wherein an acid catalyst is used.

7. The method of claim 6 wherein the acid catalyst is selected from ammonium chloride, aluminum chloride, zinc chloride, stannic chloride and mercurous chloride.

8. The method of claim 4 wherein the reaction is carried out at a temperature of 60° – 120° C.

* * * * *